United States Patent [19]

Christenson et al.

[11] Patent Number: 4,949,300
[45] Date of Patent: Aug. 14, 1990

[54] SHARING WORD-PROCESSING FUNCTIONS AMONG MULTIPLE PROCESSORS

[75] Inventors: Patrick J. Christenson; Craig W. Martens; David G. Wenz; David N. Youngers, all of Rochester, Minn.

[73] Assignee: International Business Machines Corporation, Armonk, N.Y.

[21] Appl. No.: 142,587

[22] Filed: Jan. 7, 1988

[51] Int. Cl.$^5$ .................... G06F 15/16; G06F 15/21
[52] U.S. Cl. .................... 364/900; 364/927.4; 364/933.9; 364/931.44; 364/943.43
[58] Field of Search ... 364/200 MS File, 900 MS File

[56] References Cited

U.S. PATENT DOCUMENTS

| | | | |
|---|---|---|---|
| 4,204,206 | 5/1980 | Bakula et al. | 364/900 |
| 4,463,442 | 7/1984 | Dachowski et al. | 364/900 |
| 4,503,499 | 3/1985 | Mason et al. | 364/200 |
| 4,604,710 | 8/1986 | Amezcua et al. | 364/900 |
| 4,633,430 | 12/1986 | Cooper | 364/900 |

*Primary Examiner*—Thomas M. Heckler
*Attorney, Agent, or Firm*—J. Michael Anglin

[57] ABSTRACT

A central processor holds a word-processing program and an entire document to be processed. A personal computer or intelligent terminal has an interactive display and holds code for some functions of the word processor, and stores individual pages of the document. As an operator performs editing tasks at the display, the personal computer performs locally those functions involving only the document page it holds. When additional document text is required to complete a function, the central processor performs the function on the full document. The central computer also performs all of certain other functions, regardless of where the data is stored.

8 Claims, 10 Drawing Sheets

SHARING WORD-PROCESSING FUNCTIONS AMONG MULTIPLE PROCESSORS

BACKGROUND OF THE INVENTION

The present invention concerns electronic data processing, and more particularly concerns an improved method for sharing the execution of functions performed on large data entities among multiple processors.

Word processing took a giant leap with the advent of microprocessor-based dedicated word processors and personal computers. Previous mainframe-based text processing programs, lacking a wide bandwidth between memory and text display on a terminal, and requiring time-sharing the program among multiple users, could not attain enough speed for a real-time "wysiwyg" (what you see is what you get) type word processor (WP). Presently available personal computers and dedicated word processors do successfully implement this type of WP for a single user, and their use is widespread.

However, in many cases it is desirable to house high-speed word processing programs in multiple-user minicomputers, for example. The cost of a minicomputer with terminals serving each person in a department is much less than the cost of providing individual personal computers and programs for each person, and has other advantages such as central storage of departmental records. The incremental cost of providing word processing (WP) on such a minicomputer would be low; but speeds are still not nearly high enough to provide the kind of WP functions people have come to expect from single-user machines.

Commonly assigned application Ser. No. 87,235 (filed Oct. 15, 1985 by P. J. Christenson et al.) provides a method of implementing word-processing and other programs requiring high-speed interaction with a display and involving large amounts of data. That method employs a processing system having multiple processors. A central processor (CP) is capable of operating directly upon a large data entity such as an entire document, but its code is shared among all operators. An input/output processor (IOP) interacts directly with each operator's display in real time, but it can store only a limited amount of data, perhaps only a small portion of that operator's document. Broadly speaking, the IOP executes functions of the program upon such data as is available to it in a local storage. Whenever a function requires a larger block of data, the IOP requests the CP to perform a part of the function on the data not directly available to the IOP. Typically, the IOP processes as much text as can be displayed to a user at one time on a terminal, while the CP operates on an entire document. The functions include such things as locating the occurrence of designated characters in a document ("locate", "search", etc.) and processing specified blocks of characters as a unit ("delete", "move", etc.).

The foregoing method was originally conceived in the context of a minicomputer having a microprocessor-based workstation controller and a number of "dumb" terminals attached thereto. More and more, system users attach "smart" terminals or personal computers using terminal-emulation software to such minicomputers.

SUMMARY OF THE INVENTION

Where such a personal computer or high-function terminal is connected to the central processor, significant advantages would accrue if the function division between them were shifted to take advantage of the best characteristics of both types of processor. More specifically, a central minicomputer has generally more function and performance, but a personal computer has advantages in the area of user interface and certain other performance aspects.

The present invention, then, provides improvements to the method described above which enable word processing and other interactive tasks involving large data entities to perform faster and more efficiently when a central multi-user data processor is connected to high-function auxiliary processors each serving only a single user.

Broadly speaking, the invention divides the individual functions of an overall task into two categories. Functions in the first category generally relate to operations on a large portion of the data entity, which is stored in the central processor. Category-one functions are performed entirely in the central processor, by code stored there. Category-two functions concern operations which at least potentially involve smaller portions of the data entity. These functions are performed entirely in the smaller auxiliary processor if the data portion is already stored in, or can easily be transferred to, the memory of the auxiliary processor. If a category-two function involves more of the data entity than can be stored or transferred, then the shared-function method of the above-described application may be invoked to perform a part of the function in the auxiliary processor and a part of the same function in the central processor.

DESCRIPTION OF PREFERRED EMBODIMENT

Figure 1:
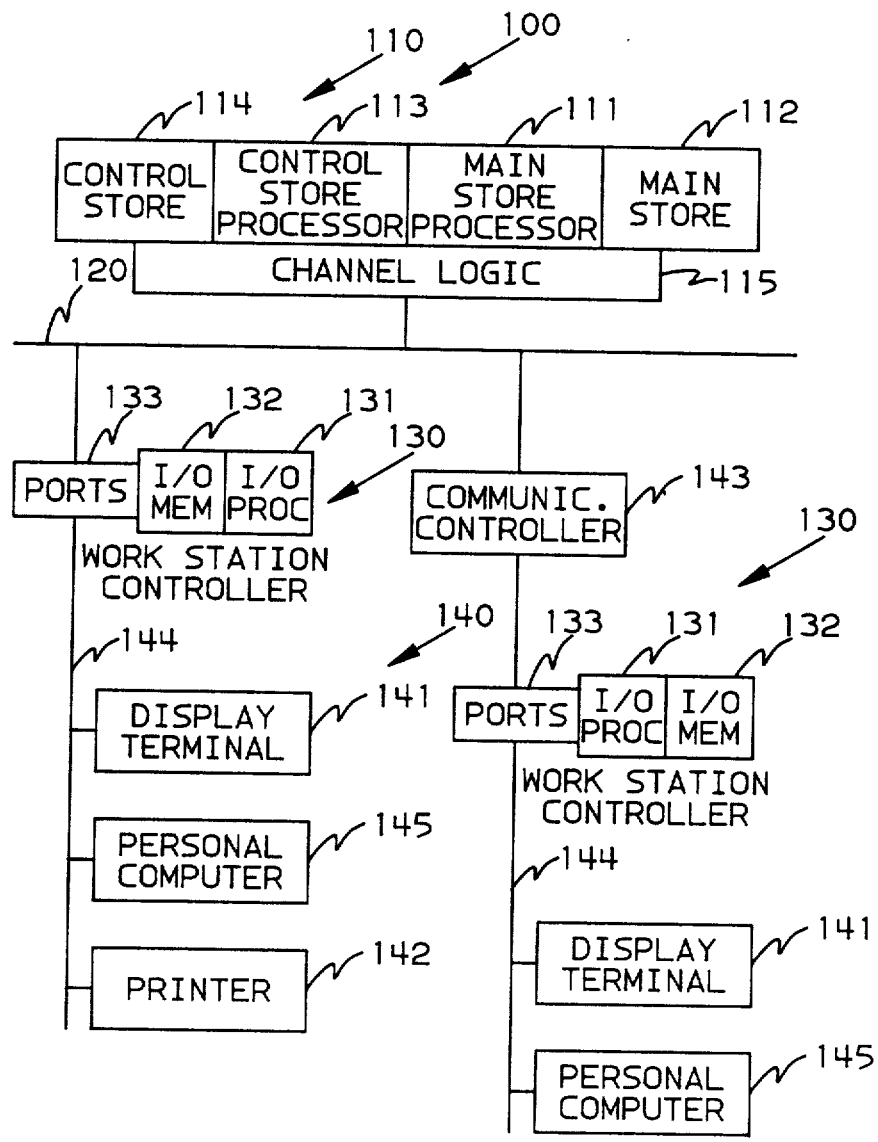
FIG. 1 is a high-level diagram of a data-processing system upon which the invention can be carried out.

FIG. 1 shows a publicly available IBM System/36 data processor 100 which may serve as an environment for the present invention. Briefly, central processor 110 includes main-store processor (MSP) 111 for executing application programs from read/write main store 112, which also holds data of various kinds. Control-store processor (CSP) 113 executes low-level operating-system tasks from read/write control store 114. CSP 113 controls channel logic 115 for transferring data at high speed to and from channel bus 120. Different types of input/output (I/O) device controllers attach to channel bus 120. Workstation controllers (WSCs) 130 interface workstation terminals 140 such as interactive alphanumeric displays 141, printer 142, and personal computers 145. Controllers 130 may be attached locally to bus 120 or remotely by a communications controller 143. Central processor 110 and WSCs 130 communicate with each other via a conventional data stream having a series of frames carrying various commands and parameters for transferring control information and the contents of display screens. Normally, central processor 110 acts as a master processor, while WSC 130 acts as a slave. That is, processor 110 sends commands to WSC 130, which executes program modules to carry out the commands, then returns responses to processor 110 via the data stream. The responses may include attention identifiers (AIDs) indicating depression of some terminal keys by the operator.

Display terminals 141 may be publicly available products such as the IBM 5250 Model 11, IBM 5291, IBM 5292, or IBM 3180 Model 2 Workstation Terminals, which communicate with controllers 130 by a multi-drop cable 144. Each controller 130 includes an I/O processor (IOP) 131, an I/O memory holding data and program code for IOP 131, and a bus coupler 133 having ports for transferring data via I/O processor 131 between I/O memory 132 and bus 120, and between memory 132 and cable 144. The conventional function of processor 131 is to execute programs residing in memory 132 for converting high-function data streams received from CP 110 into simpler, more basic commands that can be understood by dependent terminals 141, and vice versa. In other processor organizations, controller 130 might be a physical part of an intelligent terminal, rather than being located with the central processor or in its own enclosure as a freestanding unit.

Personal computers 145 may be publicly available products such as the IBM 5150, 5160, 5170, or PS/2 (TM) units. Conventionally, such units attach to a multi-drop cable 144 via an adapter card and emulator software which makes the personal computer appear to WSC 130 as a terminal such as the workstation terminals described above. Normally, such emulator software severely limits or entirely negates the performance of any other function in the personal computer while the emulator is running actively. But, as described more fully below, the invention adds further code to the emulator software to allow the personal computer to perform additional functions at the same time.

Figure 2:
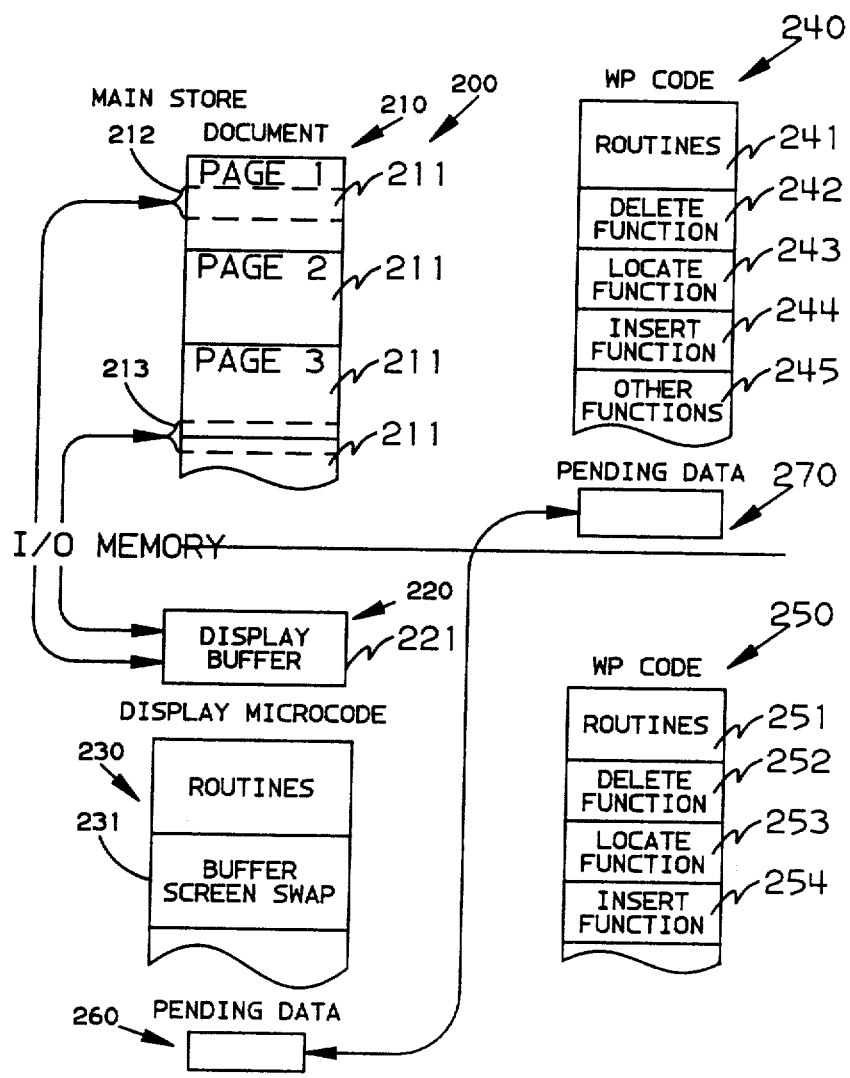
FIG. 2 shows the memory locations of data and shared-function code used in the invention.

FIG. 2 is a memory map 200 illustrating how the shared-function capability divides the WP code for processing in the previous method described in the aforementioned application.

Main store 112, FIG. 1, holds an entire document 210 to be processed. (Part of the document may physically reside on a disk file, but this is transparent.) This document is divided into pages 211. At any given time, one block 212 of the document resides in a buffer 220 defined in memory 132 of controller 130. Actually, this buffer holds only a single line of data for each terminal connected to its cable 144; a refresh buffer (not shown) in each terminal 141 holds the full screen currently being displayed, and is updated when necessary from buffer 220. This implementation detail, however, is transparent for the present purpose; for description purposes, data 221 in buffer 220 will be treated as though it contained the entire screen currently being displayed. When WSC 130 requires more data from document 210 to continue processing, swap routine 231 of WSC microcode 230, stored in IOP 131, transmits the buffer contents back to block 212; then it receives another block 213 as new data 221 in buffer 220. WSC 130 has no direct access to main store 112; processor 110 likewise has no access to I/O memory 132, nor to the refresh buffer in terminals 141. These and other transfers between buffer 220 and document 210 are actually carried out via the data stream between the two processors. For example, WSC executes microcode to access buffer 221 in its addressable memory 132, packages the buffer contents in data-stream frames, and transmits them to central processor 110. Processor 110 receives and decodes the frames, and writes the data to the appropriate addresses in main store 112.

Although the data stream is a conventional part of the publicly available IBM System/36, a brief overview of the CP-to-WSC communication is helpful in understanding how the data relevant to the invention is actually transported in this embodiment of the invention. A communication begins when CP 110 sends an interrupt to WSC 130 over channel 120. This is controlled by a program running in CSP 113 dedicated to running the workstation subsystem, and occurs when an application program executing in MSP 112 issues a command to a display or when the CSP program itself has nothing else to do and issues an "Invite" command to determine whether new data is available or needed. WSC 130 responds to the interrupt by requesting a Workstation Control Field (WSCF) from a known location in MS 112 by a cycle-steal (direct memory access, or DMA) transfer via channel 120. (Cycle-steals are mediated by CSP 113, which can address data in main store 112 directly.) The WSCF may be a command such as "Read Screen", having an operation code, a display identifier, and a maximum byte count.

WSC 130 decodes the WSCF, and initiates the transfer of a data-stream frame to carry out the request. They vary greatly in length, from 8 bytes to more than 12,000 bytes. Each frame contains an escape character and a command byte. The command byte specifies the format of the rest of the frame. Frames relevant to the invention may have two bytes specifying the entire frame length, class and type bytes encoding the interpretation to be accorded the subsequent data, one or more flag bytes, and the data from the screen. This data itself may be structured or formatted into records representing display lines, each line having a flag byte and a length byte.

WSC 130 sends the formatted data-stream frame over channel 120 by cycle-steal into main store 112. The WSC then returns the WSCF back to its location in main store with a completion code, and issues an interrupt to CSP 113 of CP 110. The workstation-subsystem program then reads the WSCF and decides what to do next. This procedure, and the data-stream contents, varies from one model of data processor to another, and may be carried out in many different ways within the concept of the invention.

In the present invention, IOP 130 also stores and executes a part of the code for a WP, an application program which would conventionally be executed by central processor 110 in MSP 111 as a single program residing in main store 112. WP code 240 located in main store 112 contains main routines 241 and individual functions such as a delete function 242, a character-locate function 243, continuous-insert function 244, and other functions 245. WP code 250 stored in I/O memory 132 contains auxiliary routines 251 and portions of some of the same functions—the "shared functions" —located in the main store. A Pending Data table 260 in I/O memory contains items for coordinating the execution of these functions. An image of table 260 is maintained in an area 270 of main store 112. The image is updated by transmitting table 260 to main store 112 in the data stream whenever CP 110 reads the display screen; correspondingly, table 260 is updated from the data in area 270 whenever CP 110 writes a display screen to WSC 130. The relevant data in table 260 is shown in the table below.

| Field Name | Length (bytes) | Bit No. | Description |
|---|---|---|---|
| Flags | 2 | 0 | Insert mode is on for this display |
| | | 1 | Locate mode is on for this display |
| | | 2 | An active Copy, Move, or Delete operation was completed, and CP had requested notification |
| | | 3 | An active Copy, Move or Delete was cancelled, and CP had requested notification |
| | | 4 | A Delete is now active |
| | | 5 | A Copy is now active |
| | | 6 | A Move is now active |
| | | | (Remaining bits not relevant) |
| Displaced Characters | 3 | (Not relevant) | |
| Start | 4 | — | Position of first character in a Copy, Move, or Delete operation |
| Locate | 1 | — | Character code to be located during a CP-assisted Locate operation |

The specific shared functions to be described as examples herein are the delete, character-locate, and insert functions, whose auxiliary code in I/O memory 132 is labelled 252–254 respectively.

Figure 3:
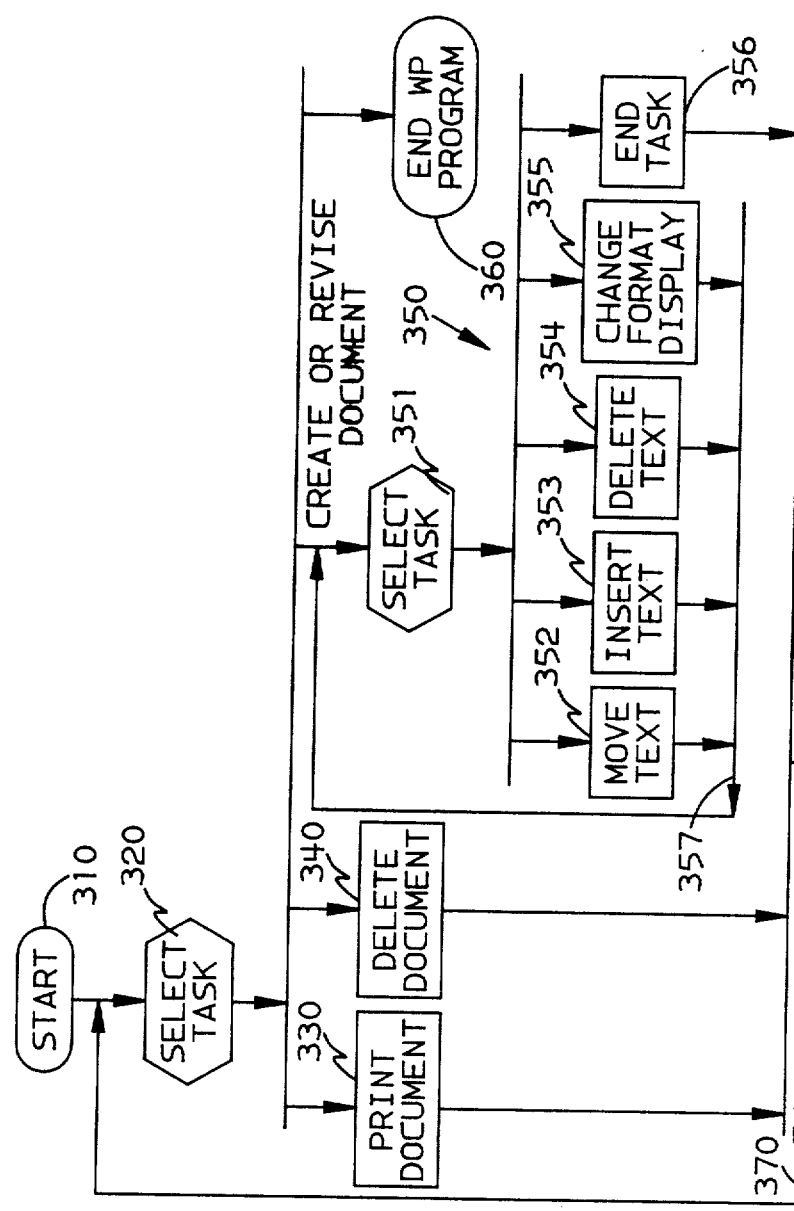
FIG. 3 is a high-level flowchart of a word-processor program in which shared functions can be implemented.

FIG. 3 is a high-level flow diagram of a program 300 for executing the main routines of the IBM Display-Write/36, a word processor 241 which uses the shared-functions concept of the aforementioned application. Program 300 runs in central processor 110; more specifically, it is stored in main store 112 and is executed by MSP 111, FIG. 1. After starting 310, the program requests 320 the operator to select a task, such as printing 330, deleting a document 340, editing 350 (creating or revising) a document, or ending 360 the WP program. When the selected task has finished, control returns 370 to block 320 for another selection.

Within each task, the operator may select individual functions to be performed, perhaps to multiple levels of detail. While editing document text, for example, block 351 displays a screen 221 of document 210. The operator may press keyboard keys to select any one of a number of functions for manipulating characters in the document. These functions include such things as moving 352, copying 353, and inserting 354 text characters, changing 355 the format of the text, and ending 356 the editing function.

A number of functions in program 300 use the shared-function concept.

Figure 4:
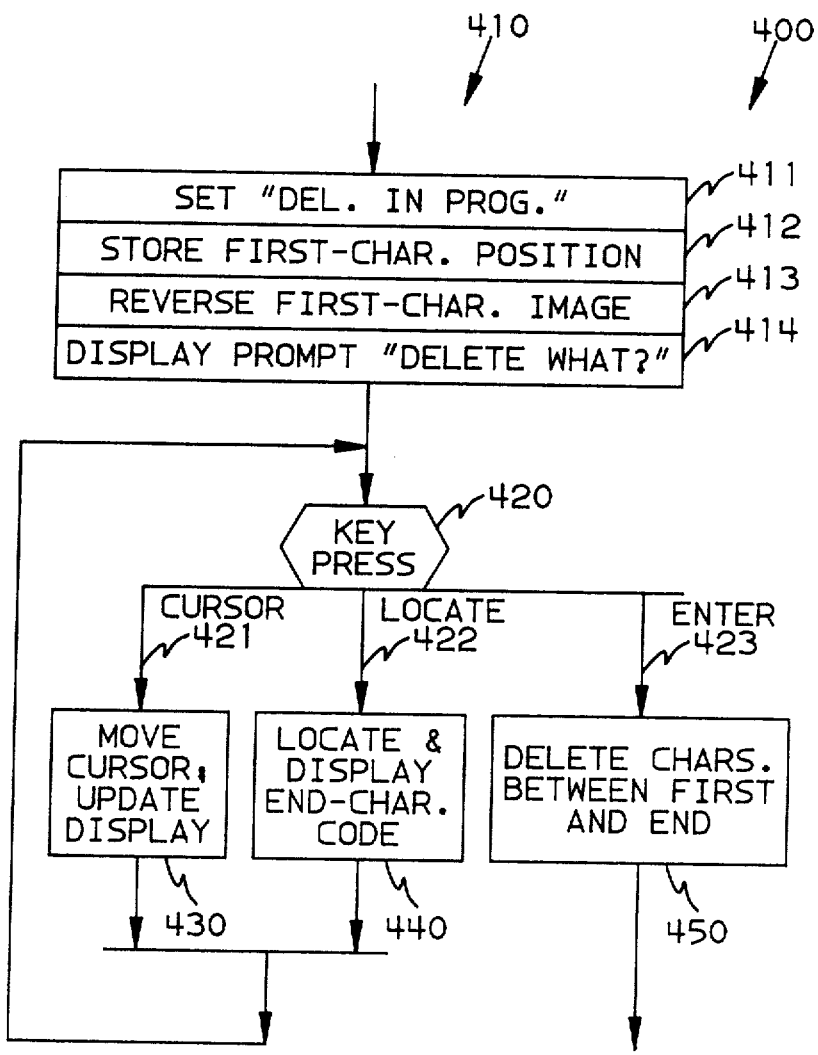
FIG. 4 is a flow chart of the "block delete" operation of FIG. 3.

FIG. 4 is a flow chart of a program module 400 detailing the operation of the delete function 354, FIG. 3, as one example of how to implement a shared function according to the invention. Program 400 runs in WSC 130; that is, it is stored in I/O memory 132 and executed by I/O processor 131. (It can be downloaded from a disk at initial program load time.) Program 400 begins when the operator presses a "Delete" key at the terminal.

Blocks 410 set up the function. The code sets 411 a "Delete-Active" bit in table 260, bit 4 in the FF field in the above table, stores 412 the location of the first character in the block (i.e., the cursor location), in the "Start" field, changes 413 the attribute of the first character to reverse-video, and displays 414 a prompt such as "DELETE WHAT?" on the screen, requesting the operator to specify the location of the last character in the block. The operator may then press 421 a cursor key to move the cursor to another character. Block 430 then moves the current cursor location. Alternatively, the operator can press 422 a character key on the keyboard, causing block 440 to locate the next occurrence of that character in the document, starting from the current cursor location. After either block 430 or 440 has finished, control returns to selection block 420. That is, any combination of the two methods 430-440 can be used in any order to define a single block to be deleted. The remaining alternative from selection 420 occurs when the operator presses 423 the Enter key, signifying that the present cursor position locates the end of the block. Code 450 then deletes all characters between the stored first-character location and the current cursor position, and updates the display.

Figure 5:
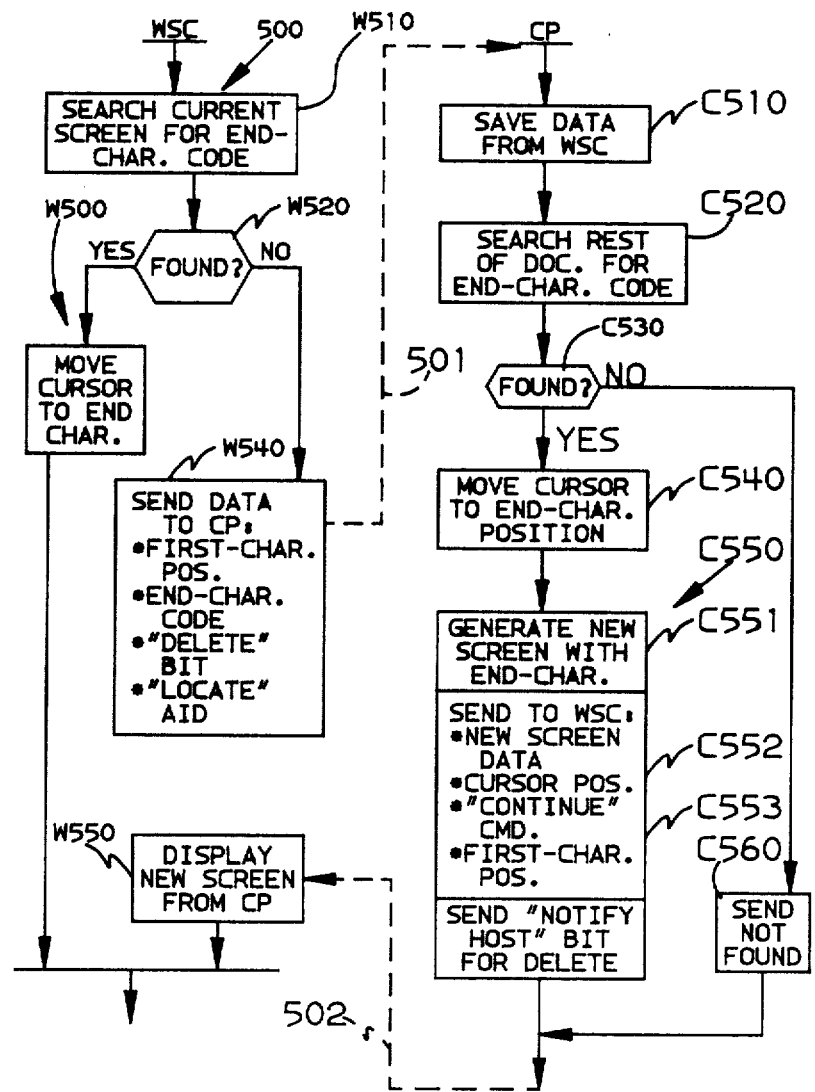
FIG. 5 details the "character locate" function of FIG. 4.

FIG. 5 is a flow chart 500 showing how the execution of block 440, FIG. 4, is shared between IOP 131 of workstation controller 130 and MSP 111 of central processor 110, FIG. 1. In FIG. 5, the steps executed in WSC 130 are prefixed with a "W", while those executed in CP 110 carry a "C". When keypress 422 activates character-locate function 440, FIG. 4, block W510 searches the current screen 221 (stored in I/O memory 132) for the keycode of the pressed key between the current cursor location and the end of the screen. If block W520 finds this code, block W530 carries out the locate function by moving the cursor to the end-character location. In this case, the entire locate function is executed in WSC 130, without any involvement of CP 110, which can thus execute other tasks at the same time, without interruption.

But, if W520 does not find the desired character code by the end of the current screen, block W540 requests CP 110 to carry out the locate function. Specifically, block W540 sends the pending-data table 260 to CP 110 in a data-stream frame, and also sends a host-assisted-locate attention identifier (AID) indicating that the locate function is to be carried out. Code C510 saves the contents of table 260 in an area 270 of main store 112. CP 110 then searches C520 the remainder of document 210 for the specified character code. When block C530 finds the character code, block C540 completes the locate function by moving the cursor to the end-character code. Blocks C550 return updated data 270 to WSC 130. Block C551 generates a new buffer-full of characters 211 containing the end character, with the cursor located under the end character. As soon as the character has been found, block C552 transmits, via the data stream, to WSC 130:

(a) data for the new screen of characters 213;

(b) a command specifying the position of the cursor on the located character within that screen;
(c) turning on the "Locate" bit in table 270;
(d) a new position for the first character in table 270;
(e) turning on the "Notify Host" bit for delete, bit 4 of field Flag1 in table 270.

If block C530 should not find the specified end character in the remainder of document 210, block C560 merely writes a message such as "CHARACTER NOT FOUND" on the current screen to WSC 130 via the data stream.

Line 502 indicates the transmission of the new data back to WSC 130. Block W550 then receives and stores the new screen and cursor location for display in terminal 141.

The following table details the contents of area 270 in MS 112, FIG. 1.

| Field Name | Length (bytes) | Bit No. | Description |
|---|---|---|---|
| Flag1 | 1 | 0 | Set Insert mode off/on for this display |
| | | 1 | Set Locate mode off/on for this display |
| | | 2 | Execute Delete operation in WSC/CP |
| | | 3 | (Not relevant) |
| | | 4 | Don't/do notify CP when current active Copy, Move, or Delete operation is completed or cancelled |
| | | 5-7 | (Not relevant) |
| Flag2 | 1 | 0 | Allow/prohibit Copy, Move, or Delete operation |
| | | 1-7 | (Always OFF) |
| Displaced Characters | 3 | — | (Not relevant) |
| Start Loc | 4 | — | Row-column location of start of a Move, Copy, or Delete operation |

Figure 6:
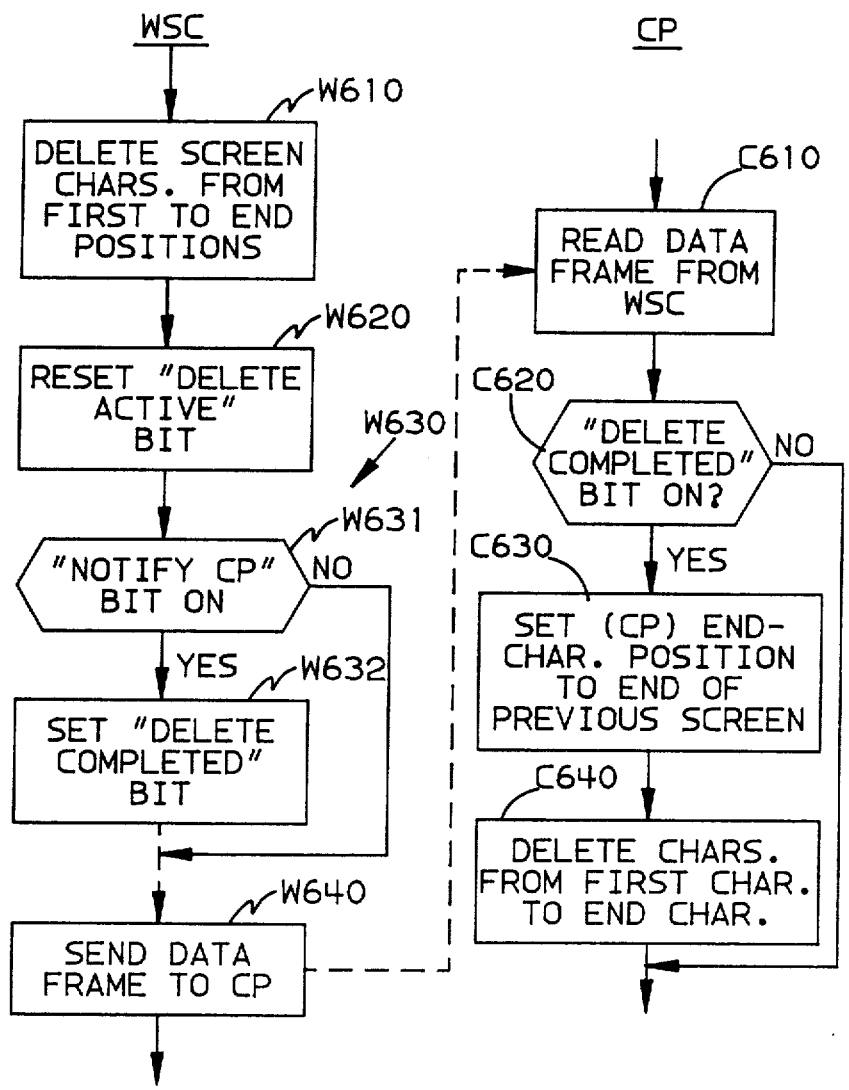
FIG. 6 details the "delete characters" function of FIG. 4.

FIG. 6 is a flow chart 600 of delete function 450, showing what happens when the operator presses the "Enter" key after having defined the block of characters to be deleted. Again, blocks executed by WSC 130 are prefixed by "W"; a "C" denotes blocks executed by CP 110.

Block W610 deletes the characters in the current screen 221 from the displayed first-character position to the end-character position marked by the cursor. As previously described, the first-character position is the actual beginning of the delete block if the current screen is the same as the screen in which the delete operation was started. Otherwise, the first-character position is the first character in the current screen: i.e., the screen in which the delete operation ends. WSC 130 then resets the "Delete Active" bit (Flags bit 4 of buffer 260) in block W620. Blocks W630 synchronize the function sharing if necessary. If the "Notify CP of Delete Completion" bit (Flags1 bit 4 of buffer 270) is ON in block W631, block W632 sets the "Delete Completed" bit (Flags bit 2 in buffer 260); this bit had been set in block C552, FIG. 5 if the operation was seen to span multiple screens. At a later time, block W640 transmits a data frame to CP 110. The frame includes data table 260; as mentioned above, tables 260 and 270 are updated from each other's data every time a screen is read from WSC 130 or written to CP 110.

WSC 130 then exits to block 450, FIG. 4, which in turn exits block 354, FIG. 3.

When CP 110 later reads C610 the data frame sent by W640, it checks C620 for the "Delete Completed" bit (Flags bit 2 in buffer 260). If this bit is on, block C630 repositions the end-character location to a position in document 210 just before the first character of the current screen. This is done by changing the "Start Location" field in buffer 270. Block C640 deletes all characters in document 210 from the stored (in buffer 270) first-character location in screen 212 to the (new) end-character location.

MSP 111 of CP 110 then continues with other tasks, such as display requests for other documents. These tasks might or might not be connected with the present invention.

Thus, if the delete operation spanned more than one screen of text, it is shared between the two processors: WSC 130 deletes the characters on its current screen, while CP 110 deletes the remaining characters directly in document 210. But, if only the current screen is involved, CP 110 does not share the deletion operation, and WSC 130 performs the entire task. In either case, all characters changed in the current screen will be updated in document 210 at a later time, whenever CP 110 requests a screen read.

Another function shared between WSC 130 and central processor 110 is that of continuous insertion of new display lines as needed for text-character entry. The normal mode in which the word processor enters new characters into a document is to insert them at the cursor location, pushing all characters to the right of the cursor on the same line one position to the right as each new character is displayed. When the line becomes too long—that is, when a non-null character enters the right-margin column—these characters of the rightmost word are moved into a new line, and other lines are scrolled up or down on the display to make room for the new line. This function appears as block 353 in FIG. 3, and is executed whenever the operator is entering text and has not invoked some other task such as moving or deleting characters.

Figure 7A:
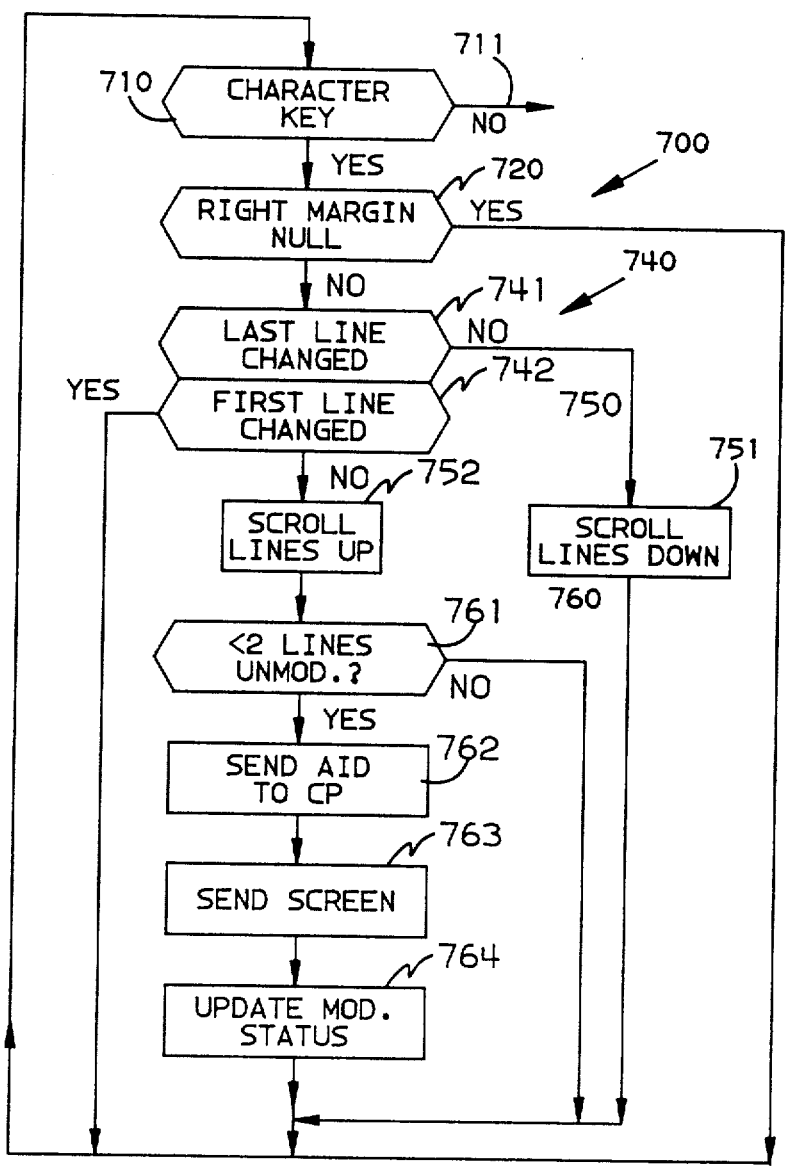
FIG. 7, consisting of FIGS. 7A and 7B, is a flow chart of the "continuous insert" operation using shared functions.
Figure 7B:
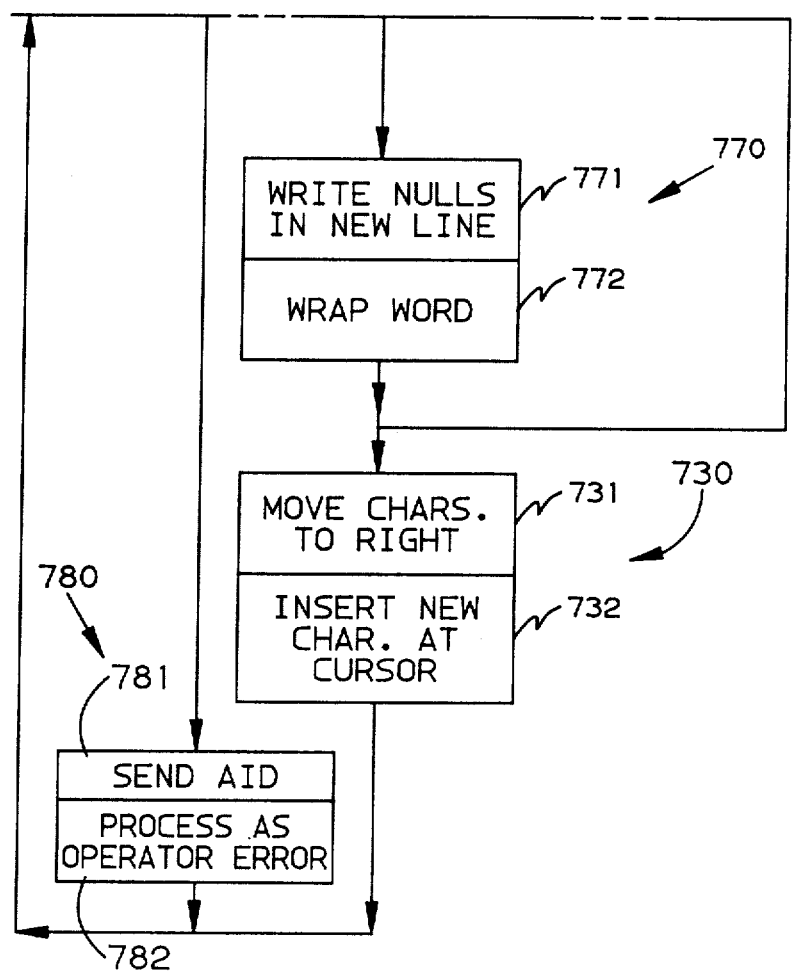

FIG. 7 represents code 700 for sharing the insert function between the two processors. This code is a WSC 130 module; that is, the code resides in memory 132 and is executed by processor 131.

When the operator presses a character key at 710 to insert new characters at the cursor position in an existing line, block 720 decides whether or not a new display line is required. If the existing line contains only null characters between its rightmost character and the right margin column, control passes immediately to blocks 730. These blocks merely make room in the existing line for the character to be inserted. Block 731 moves the characters from the cursor location one space to the right; block 732 inserts the new character in the space thus opened up at the cursor location.

If the existing line is already full (no null at the right margin), a new line must be inserted below the cursor position. Blocks 740 determine which way the existing display lines will be scrolled 750 to make room for the new line. If block 741 finds that the last (lowermost) text line on the display has not been modified since the present screen was displayed, block 751 scrolls downward all the lines below the cursor position, pushing the last line off the screen. No information is lost, because the same up-to-date data is contained in portion 212 of document 210 in MS 112. Blocks 770 then prepare the new line. Block 771 overwrites all the characters in the line immediately below the cursor with null characters.

Block 772 word-wraps the last word the cursor line; that is, the entire word having its rightmost character in the right-margin column is moved to the new line. Blocks 730 then insert the new character as previously described.

If the last display line has been changed but block 742 finds that the first (uppermost) text line has not, block 752 scrolls upward all the lines above the present cursor position, pushing the first line off the screen. Blocks 760 anticipate future scrolling needs. Block 761 detects whether fewer than two scrollable text lines remain on the screen; these may be two unmodified lines at the bottom of the screen, two at the top, or one at the top and one at the bottom. If fewer than two scrollable lines remain, block 762 sends an AID to CP 110 for an update of document 210. This occurs when block 763 reads the screen back to the document 210. Block 764 then changes the status of all screen lines to "unmodified," so they can be scrolled off the screen if required, without losing any changes made by the operator. Control then passes to blocks 770, and thereafter to blocks 730. The actual screen read will be done by CP 110 at some time after block 762 has been executed; this does not interrupt the operator, who may continue to key in characters.

If blocks 740 detect that both the first and the last display lines have been changed since the screen was displayed, a scroll in either direction would destroy modified data. This can occur if the screen reads done by blocks 760 cannot occur fast enough to provide scrollable line before they are actually needed. This rare case is treated as an error condition by blocks 780. Block 781 sends an AID to CP 110 requesting an immediate screen read. Block 782 signals the operator of an error, and locks the keyboard. (The operator must then press a "Reset" key and reenter the character.)

Control then returns to block 710 to continue character insertion. If the operator presses a function key instead of a character key, exit 711 returns to FIG. 3.

The above description shows the sharing of several functions, block delete, character locate, and continuous insert. The DW/36 word processor shares other functions, such as moving and copying blocks of characters, in substantially the same way. The character-locate function is used with other functions besides deletion, and can also be used by itself as a standalone function.

The preferred embodiment for the improved method of the present invention uses CP 110 as the multi-user, high-performance central processor and a personal computer (PC) 145 as the single-user, lower-performance auxiliary processor. (PC 145 has, of course, a display for presenting data to an operator, and a keyboard for accepting data and commands from the operator.) In the following description, IOP 130 functions in a conventional "pass-through" mode, merely transferring data back and forth between CP 110 and PC 145 without performing any word-processing functions upon it.

Rather than sending document data back and forth in screen-buffer sized portions, this embodiment transmits document data as "pages" of text, corresponding to large pages of the document along with enough formatting information about the page that PC 145 can store and format the page in its own memory. (In effect, PC 145 sees the downloaded page as an entire document, complete with a format specification.)

PC 145 executes program code located in the PC to perform certain word-processing functions upon the page available in its memory. These include copying, moving, and deleting text. When one of these functions requires more text than is available in the local page, PC 145 transmits the function request to CP 110, and CP 110 then performs the function with its own code for the same function, upon any data in the entire document located in the CP's memory.

Program code for certain other word-processing functions, however, is always done in CP 110 upon the entire document, as will be explained.

Figure 8:
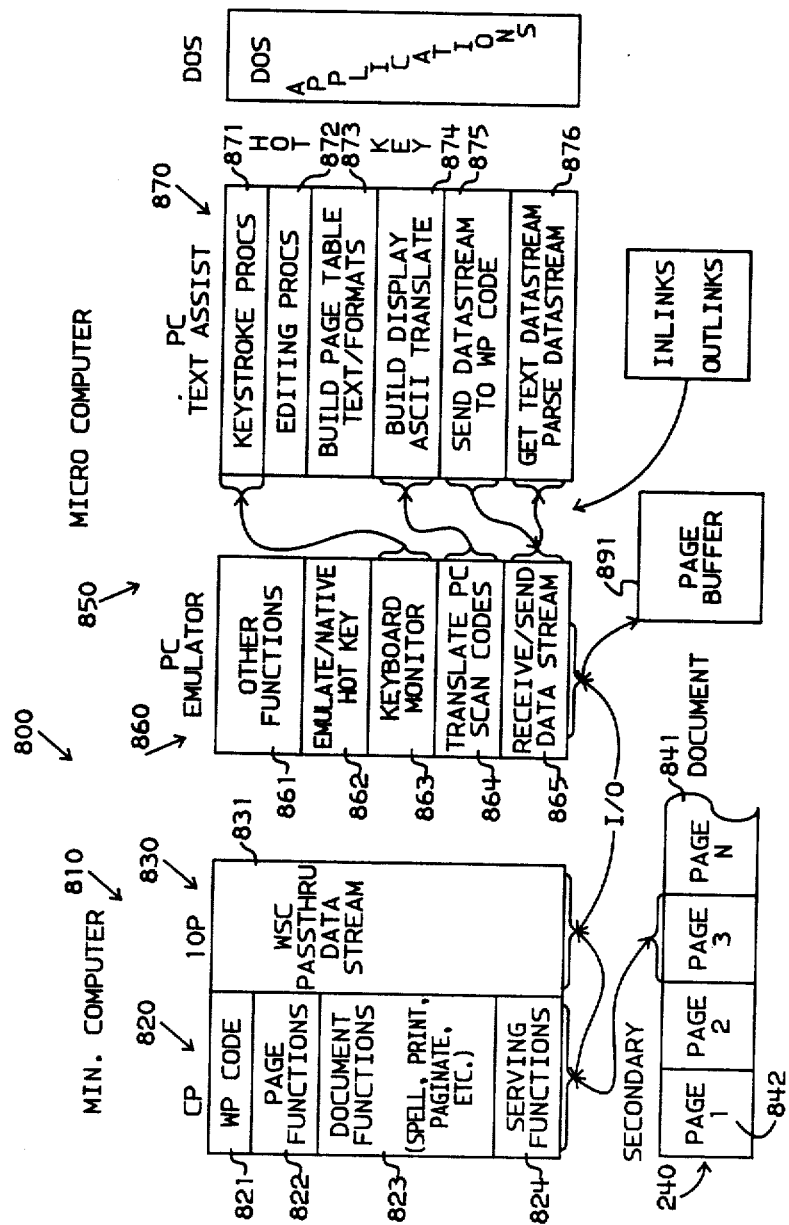
FIG. 8 shows memory locations of data and code used in the present invention.

FIG. 8 shows the location of the code and data relevant to the present invention. Details of this implementation are publicly available as parts of the IBM DisplayWrite/36 (Release 5.1) and the IBM PC Support/36 Workstation Feature. More specifically, the portions relevant to the invention are located mostly in the Text Assist function of the PC Support/36 Organizer. A publicly available emulator is the IBM 5250 Enhanced Emulation Program.

The letters "CP" and "IOP" in FIG. 8 designate items in the memory of CP 110 and IOP 130 (FIG. 1), respectively. The remaining code and data are stored in the memory of PC 145. The column labelled "PC Emulator" contains conventional functions of the aforementioned emulation program. The column labelled "DOS" contains conventional code for an operating system and other user programs for the personal computer. The middle column, "PC Text Assist," incorporates code for the present invention.

FIG. 8 is a memory map 800 illustrating how the invention is divided into components between the memory 810 associated with the central processor and the memory 850 of the personal computer. For the present purpose, memory 810 includes components in the proper memory 810 of CP 110, FIG. 1, and also memory 830 of IOP 130 and any secondary storage 840, such as on-line disk drives, available to CP 110.

Memory 820 contains word-processor code which includes control code 821 and three components 822-824 for performing different categories of functions.

Figure 9:
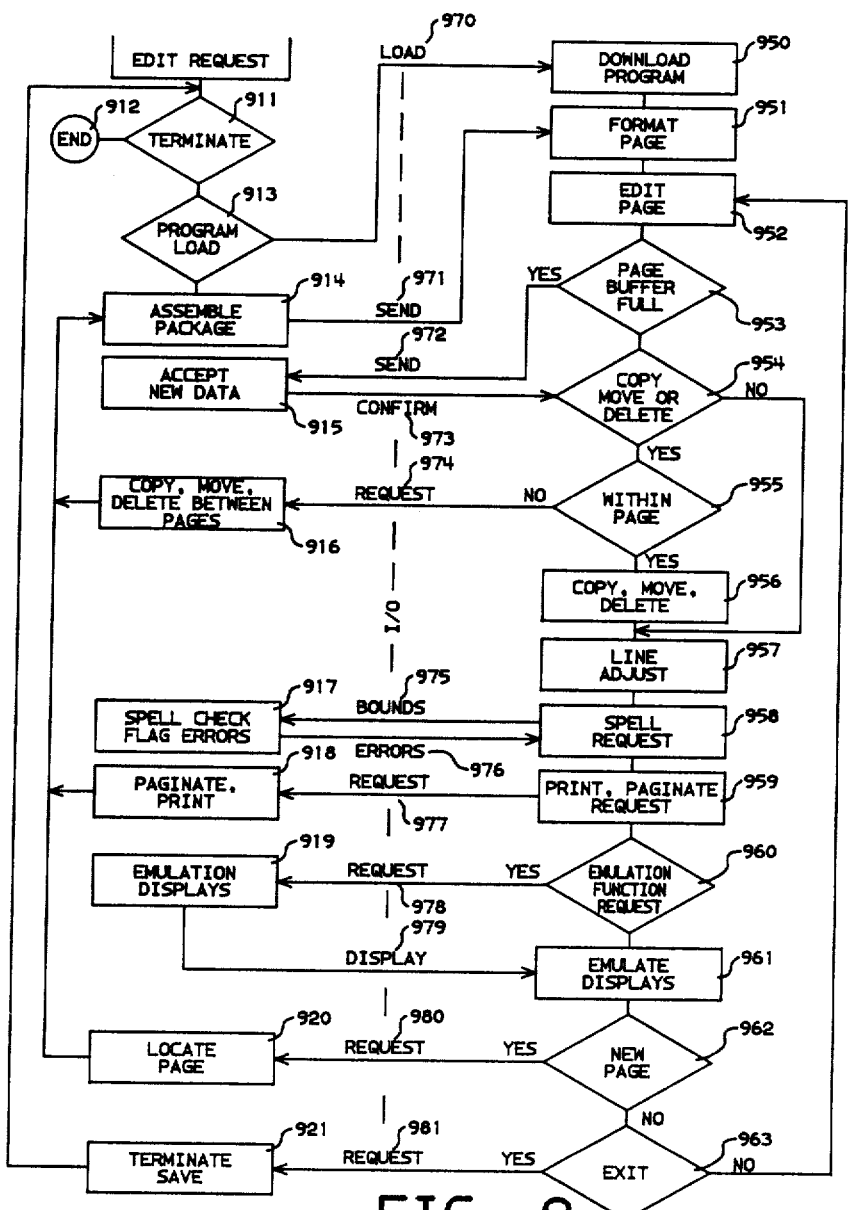
FIG. 9 is a flowchart of a method according to the invention, showing both control and data flow.

Control code 821 performs a number of editor functions not implemented on the PC; see the description of emulation displays under FIG. 9. Page-processing functions 822 are typical to a word processor and include the functions mentioned in connection with FIG. 2 as being "shared functions," such as insert, delete, move, copy, find, and so forth; code 822 is executed only when the requested function requires more document data than is available in the PC 145. Document-processing functions 823 inherently require large portions of a document; these typically include spell-checking, paginating, printing, and so forth. Code 823 is always executed when one of its functions is invoked from PC 145. Code 824 involves serving functions for transferring document pages back and forth between CP memory 810 and PC memory 850. Page serving is accomplished by using the I/O Processor 830 Data Stream Passthru capability 831; the IOP 130 does not interpret the datastream, but passes it through to the PC memory 850 intact.

Storage 840 holds the entire document 841 being processed. The document is divided logically into a number of pages 842, each corresponding roughly to one page of typescript. Page length is, however, arbitrary and variable. Document 841 is preferably stored on a disk, with portions brought into random-access memory by any conventional caching or buffering means; storage 840 conceptually includes all the components required to store and access document 841.

The PC memory 850 contains a conventional emulator 860, whose overall task is to make PC 145 appear to WSC as a conventional terminal such as 141. The emulator runs under a conventional operating system such as IBM PC-DOS, along with a number of other application programs 880. Text-assist (TA) code 870 communicates with emulator 860 via a number of inlinks and outlinks 890; these are conventional control blocks that control the communication among the different modules of code 860 and 870. The text-assist code 870 also allows the user to hotkey to operating-system code 880, so that other application programs may execute. The TA code 870 remains in memory during DOS program 880 execution, unless DOS explicitly removes it.

The emulator 860 provides several conventional features 861 not relevant to the text-assist component 870.

The primary ones include emulation 862 itself, which allows PC 145 to act as a "dumb" terminal 141 for executing functions on CP 110; again, see the description of emulation displays in connection with FIG. 9.

Keyboard monitor 863 gets the user's keystrokes and passes them to a TA keystroke processor 87. Code module 864 translates conventional PC keyboard scan codes in order to build an ASCII display 874. Emulator 860 also has a component 865 to send and receive datastreams in a known format; component 865 interfaces to TA component 875 for sending the datastream to WP code 820 on CP 110, and a component 876 that performs a parse-datastream operation to get it into the proper form for component 873.

Two additional components of TA 870 do not communicate directly with emulator 860. Component 872 contains code for performing a category of editing procedures. The procedures of component 872 do all of the editing functions within the current page of text. The functions in this category include inserting, deleting, copying, and moving text, line adjusting, and word wrapping. Component 873 provides code for converting the text datastream, formatting it, according to the page and line format data from CP 110, and building a display page to be presented to the user on the PC display.

Block 891 is a buffer in the memory of PC 145 which holds the current document page and its format. The current page is stored substantially as a one-page document with standard DisplayWrite format.

FIG. 9 is a diagram 900 describing the flow of control of the preferred embodiment. The method is executed primarily by two programs: word-processing (WP) code 930, which is the main routine of IBM DisplayWrite/36 running in CP 110, FIG. 1, and text-assist (TA) code 940, which is a program running in PC 145.

The dashed line down the middle of FIG. 9 represents the boundary between operations performed in CP 110 and those performed in PC 145.

First, the user specifies, at block 910, a document to be edited. Block 911 provides termination code for exiting the entire WP program at end point 912. Block 913 determines whether the TA program 940 is already loaded; the TA program remains resident as long as PC 145 is powered on and communications is uninterrupted. If the TA code is not loaded, it is downloaded at 970 to the PC and becomes a resident download program 950.

The first page of the document 840, FIG. 8, is then assembled at 914 and sent to the PC block 951 at line 971. TA code 940 then formats the page at 951, putting a display page up for user interaction.

Editor block 952 waits for the user to specify a desired action on the document, then performs various basic editing functions, such as inserting text, word-wrapping to the next line, locating text, and Block 953 monitors for buffer-full condition; if the buffer holding page 891 is full, line 972 sends the modified data to the WP code 915 for storage in document 841. Line 973 confirms receipt of this data to the TA program 940.

If the user had selected a copy, move, or delete function, then block 954 causes block 955 to determine whether the data necessary to perform the function is within the current page buffer. If it is not, line 974 sends the request back to WP code block 916 to perform the requested copy, move or delete. Block 916 performs the entire operation on all the relevant document data. If the request involves data only within the current page, block 956 performs the copy, move, or delete within PC 145 by means of TA code 940. Any line-adjusting required because of editing activity is entirely performed by TA code, at block 957.

If the operator had requested (at block 952) spell-checking or other linguistic functions such as synonyms, block 958 obtains the start and end locations the user had specified in block 952 and these bounds are sent via line 975 to WP code block 917 to handle the spell checking or other function upon the stored document 840 in CP 110. Line 976 returns error flags (e.g., for misspelled words) to TA spelling function 958, which provides a display of the errors.

Block 959 sends printing and pagination requests on line 977 to the WP code block 918, which provides that function entirely within CP 110.

Some of the functions of the overall DisplayWrite/36 word processor are still performed as though the PC 145 were a dumb terminal; these are functions which execute just as efficiently on CP 110 as they would on PC 145, so there is no reason to move them to the PC with its limited memory space and performance characteristics. These functions include, for example, multi-column operations and page/line format changes. When any of these functions had been requested at 952, then block 960 sends a request on line 978 to the WP code 919. Block 919 causes the appropriate function to be executed in CP 110 and transmits the necessary display screens to the PC via the emulator 860, FIG. 8. (These displays are not normally pages of the document, but rather menus, messages, etc.) This allocation of functions provides the user with all of the capability of the WP code without requiring the code to be actually present in both processors 110 and 145.

If, because of searches or scrolling by the user, a new page is required, block 962 sends a request 980 to WP code block 920. Block 920 determines which page of the document stored in CP 110 should be sent, and transfers control to block 914. This blocks, as described previously, assembles the requested page and sends it to the TA code at 972.

If the user requests an exit from the document, block 963 sends a request 981 to termination code 921. Block 921 then saves the document buffer 891 back to document 841, and closes down the word processor.

Other applications, such as a database management system, could also use the present invention to divide functions such as record searching or updating using the same concepts. Office-management systems also offer an environment conducive to the use of this invention. Other implementations may employ different processor organizations from that shown. Additional levels of processors could be used to operate on screens, pages, documents, and folders of documents, if desired.

Having described an embodiment thereof, we claim as our invention:

1. A method of performing an interactive task upon a data entity by means of a first central data processor and a second auxiliary data processor, said auxiliary processor being adapted for display to and input from an operator, said method comprising the steps of:
   (a) storing said entire data entity in said central processor;
   (b) transferring a portion of said data entity to said second processor;
   (c) displaying at least some of said data-entity portion on said display under the control of code located in said auxiliary processor;
   (d) receiving in said auxiliary processor a command input by said operator to perform a predetermined function upon said entity;
   (e) if said function belongs to a first predefined category, performing said predetermined function in said central processor, by means of code located entirely in said central processor, upon said data entity located in said central processor;
   (f) if said function belongs to a second predefined category, determining in said auxiliary processor whether said function involves only data in said data-entity portion located in said auxiliary processor;
     (1) if so, performing said predetermined function entirely in said auxiliary processor, by means of program code located in said auxiliary processor, upon data located in said auxiliary processor;
     (2) if not, performing the same predetermined function in said central processor, by means of program code located in said central processor, upon data in the same data entity located in said central processor.

2. A method of performing an interactive task upon a data entity by means of a first central data processor and a second auxiliary data processor, said auxiliary processor being adapted for display to and input from an operator, said method comprising the steps of:
   (a) storing said entire data entity in said central processor;
   (b) transferring a portion of said data entity to said auxiliary processor;
   (c) receiving in said auxiliary processor a specification of a function to be performed upon said data entity from an operator at said auxiliary processor;
   (d) determining whether said function belongs to a first category and whether said function involves only said portion of said data entity presently in said auxiliary processor;
   (e) if so,
     (1) performing said function in said auxiliary processor by means of code located in said auxiliary processor;
     (2) displaying information from said function at said auxiliary processor by means of code located in said auxiliary processor;
   (f) otherwise,
     (1) performing said function in said central processor by means of code located in said central processor;
     (2) emulating a terminal in said auxiliary processor;
     (3) displaying information from said function in said auxiliary processor by means of said emulated terminal.

3. The method of claim 2, further comprising:
   (g) after the completion of said function, determining whether a new portion of said data entity is required for possible further processing in said auxiliary processor;
   (h) if so, transferring a further portion of said data entity from said document from said central processor to said auxiliary processor.

4. The method of claim 3, wherein said data entity is a text document, and wherein said portions are predefined pages in said document.

5. The method of claim 3, wherein said document contains formatting data specifying a format for other data in said document, and wherein steps (b) and (g) include transferring said formatting data from said entire document in said central processor to said auxiliary processor, and formatting said other data in said portion according to said formatting data transferred from said central processor.

6. A system for performing a plurality of different functions upon a document included in a data entry, said system comprising:
   (a) a central processor;
   (b) storage means, coupled to said central processor, for holding an entire document;
   (c) a first program code, executable by said central processor, for performing a first category of document functions upon said entire document;
   (d) means for transferring portions of said document to an auxiliary processor;
   (e) an auxiliary processor;
   (f) buffer means, coupled to said means for transferring, for storing any of said portions;
   (g) display and input means, coupled to said buffer means, for communicating with an operator;
   (h) a second program code, executable by said auxiliary processor, for performing a second category of document functions upon any of said document portions transferred to said auxiliary processor; and
   (i) an emulator, executable by said auxiliary processor, for causing said auxiliary processor to emulate a terminal when any of said document functions is being performed in said central processor.

7. The system of claim 6, wherein said central processor further includes
   program code for performing further document functions in said central processor, and for communicating with said auxiliary processor via said emulator.

8. The system of claim 6, wherein said document includes formatting data and a number of pages containing text data, and wherein said transferring means transfers one of said pages along with at least some of said formatting data.

* * * * *